United States Patent
Chiu et al.

(10) Patent No.: US 8,990,922 B2
(45) Date of Patent: Mar. 24, 2015

(54) ACCESS CONTROL SYSTEM AND CONTROL METHOD THEREOF

(71) Applicant: Cheng Uei Precision Industry Co., Ltd., New Taipei (TW)

(72) Inventors: Yi Hao Chiu, New Taipei (TW); Chao Chun Wang, New Taipei (TW); Cheng Kang Chou, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 48 days.

(21) Appl. No.: 13/875,142

(22) Filed: May 1, 2013

(65) Prior Publication Data

US 2014/0331312 A1   Nov. 6, 2014

(51) Int. Cl.
*G06F 7/04* (2006.01)
*H04W 12/08* (2009.01)

(52) U.S. Cl.
CPC ..................... *H04W 12/08* (2013.01)
USPC .......................................................... 726/16

(58) Field of Classification Search
CPC ........... G07C 9/00087; G07C 9/00563; G07C 2009/00174; G06F 21/32; H04W 12/08
USPC ...................... 713/186; 726/2, 5, 34; 380/270
See application file for complete search history.

(56) References Cited

U.S. PATENT DOCUMENTS

| | | | |
|---|---|---|---|
| 6,848,052 B2 * | 1/2005 | Hamid et al. | 713/186 |
| 7,065,647 B2 * | 6/2006 | Funahashi | 713/168 |
| 7,170,998 B2 * | 1/2007 | McLintock et al. | 380/277 |
| 8,333,321 B2 * | 12/2012 | Gressel et al. | 235/382 |
| 2003/0163710 A1 * | 8/2003 | Ortiz et al. | 713/186 |
| 2006/0250578 A1 * | 11/2006 | Pohl et al. | 351/210 |
| 2011/0086611 A1 * | 4/2011 | Klein et al. | 455/407 |
| 2011/0191840 A1 * | 8/2011 | Ortiz et al. | 726/7 |
| 2013/0331027 A1 * | 12/2013 | Rose et al. | 455/41.1 |

FOREIGN PATENT DOCUMENTS

WO     WO2012078061 A1 *  6/2012

* cited by examiner

*Primary Examiner* — Samson Lemma
(74) *Attorney, Agent, or Firm* — Muncy, Geissler, Olds & Lowe, P.C.

(57) ABSTRACT

An access control system includes a mobile device, a control device and an electronic lock module. The mobile device includes an input module, an identification module, a display module, a storage module, a battery module, a wireless transmission module and a central processor. The control device connects with the mobile device wirelessly and includes a wireless transceiver module, a power module, a memory module, an electronic control module and a microcontroller. The electronic control module of the control device is electrically connected with the electronic lock device. The identification module captures the biological characteristic of the user so as to make the identification module identify the biological characteristic of the user, so as to lower an identification burden of the access control system and ensure a usage security of the access control system.

9 Claims, 2 Drawing Sheets

ACCESS CONTROL SYSTEM AND CONTROL METHOD THEREOF

BACKGROUND OF THE INVENTION

1. Field of the Invention

The present invention generally relates to an access control system, and more particularly to an access control system based on wireless communication network and a control method thereof.

2. The Related Art

Currently, urban residents who live in residential areas have gradually realized residential area management. As the urban residents request a safety management of the residential area to be promoted continuously, an access control system based on wireless communication network has been widely used in the daily safety management of the residential area. Accordingly, the urban residents living in the corresponding residential area are users of the access control system. The access control system based on the wireless communication network generally includes a mobile device, a control device connected with the mobile device wirelessly, and an electronic lock device electrically connected with the control device. The mobile device defines a specific button, When the user wants to pass the access control system, the user just need press the specific button of the mobile device to send out a control signal to the control device, and then the control device sends the control signal to the electronic lock device for unlocking the electronic lock device.

However, the electronic lock device of the aforesaid access control system is unlocked only by virtue of pressing the specific button of the mobile device, and everyone who holds the mobile device can unlock the electronic lock device. As a result, a usage security of the access control system is affected.

SUMMARY OF THE INVENTION

An object of the present invention is to provide an access control system. The access control system includes a mobile device, a control device and an electronic lock module. The mobile device includes an input module for inputting data, an identification module for capturing and identifying biological characteristics, a display module for displaying information of the mobile device, a storage module for storing application programs, basic information, passwords, random identification numbers and biological characteristics, a battery module for providing working power of the mobile device, a wireless transmission module for transmitting wireless communication network signals, and a central processor connecting and controlling the input module, the identification module, the display module, the storage module, the battery module and the wireless transmission module. The control device connects with the mobile device wirelessly, the control device includes a wireless transceiver module for transmitting the wireless communication network signals, a power module for providing working power of the control device, a memory module for storing the random identification numbers and the passwords, an electronic control module and a microcontroller connecting and controlling the wireless transceiver module, the power module, the memory module and the electronic control module. The electronic control module of the control device is electrically connected with the electronic lock device for locking or unlocking the electronic lock device.

Another object of the present invention is to provide a control method of the access control system. The control method of the access control system is described hereinafter.

Step one: the identification module of the mobile device captures the biological characteristic of the user. Step two: the captured biological characteristic of the user is stored in the storage module and the identification module of the mobile device distributedly identifies whether the captured biological characteristic of the user is consistent with a biological characteristic sample of the user by the control of the central processor. If the identification is successful, execute step three. If the identification is failed, returns to execute the step one until the identification is successful. Then execute the step three. Step three: the random identification. number of the user downloaded to the user application program is transmitted to the memory module by virtue of the wireless connection between the wireless transmission module and the wireless transceiver module, and the random identification number of the user is compared again with the random identification numbers of the users stored in the memory module by the control of the central processor. If the comparison is successful, execute step four. If the comparison is failed, the microcontroller feeds back a failure message to the display module. Then execute step five. Step four: the microcontroller transmits a control signal to the electronic control module, and the electronic control module controls the electronic lock device to receive the control signal to execute an unlock action. In the same time, the microcontroller feeds back a success message to the display module. Step five: the network communication between the mobile device and the control device is terminated.

As described above, the identification module of the mobile device captures the biological characteristic of the user so as to make the identification module of the access control system identify the biological characteristic of the user, so as to lower an identification burden of the access control system and ensure a usage security of the access control system. Furthermore, the captured biological characteristic of the user is stored in the storage module and the identification module of the mobile device distributedly identifies whether the captured biological characteristic of the user is consistent with the biological characteristic sample of the user by the control of the central processor so as to lower a misidentification rate of the access control system.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
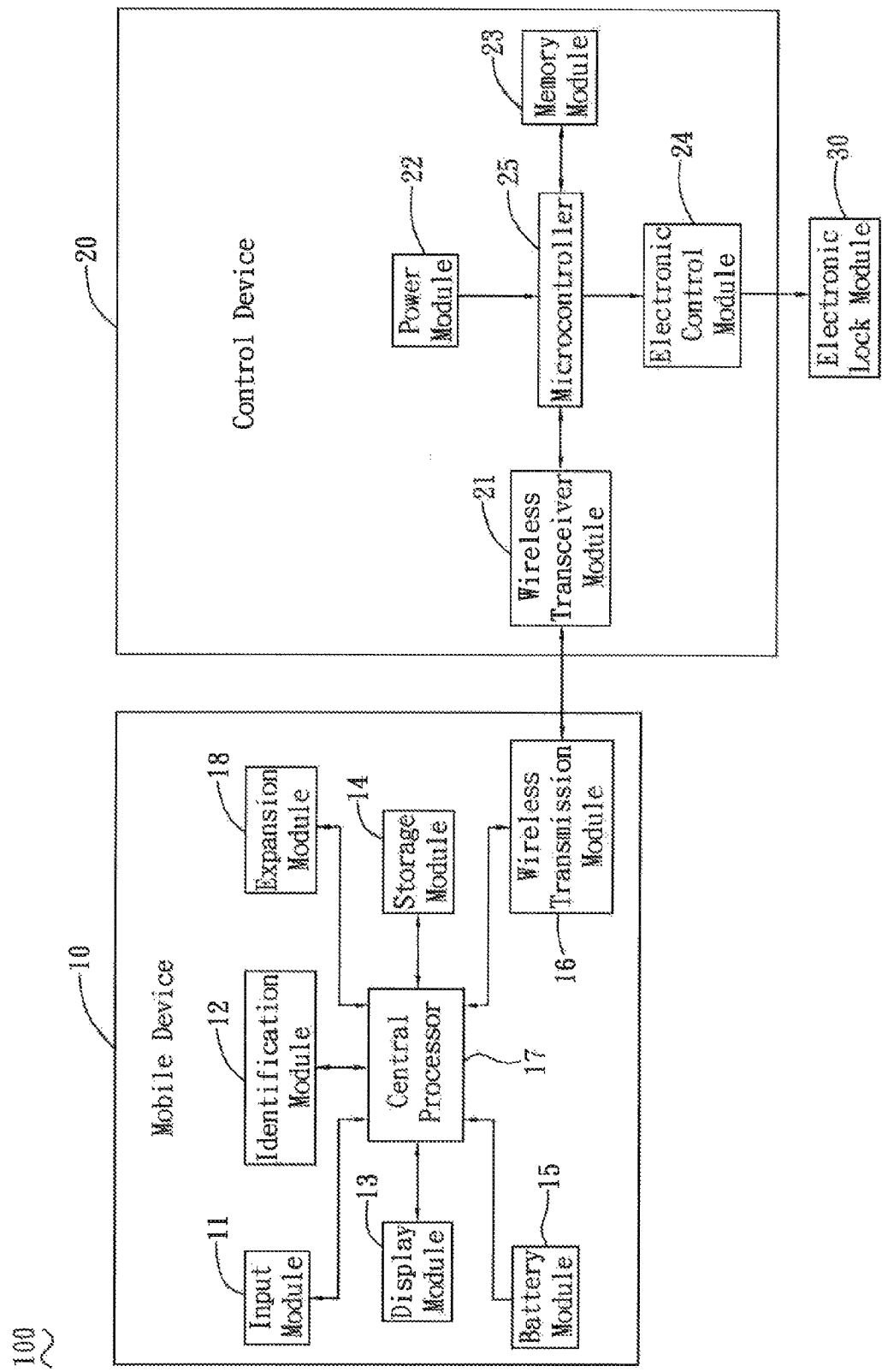
FIG. 1 is a schematic block diagram of an access control system in accordance with an embodiment of the present invention.

With reference to FIG. 1, an access control system 100 in accordance with an embodiment of the present invention is shown. The access control system 100 based on wireless communication network includes a mobile device 10, a control device 20 and an electronic lock device 30. In the embodiment of the present invention, the mobile device 10 is a cell phone.

Referring to FIG. 1, the mobile device 10 includes an input module 11 for inputting data, an identification module 12 for capturing and identifying biological characteristics, a display module 13 for displaying information of the mobile device 10, a storage module 14 for storing application programs, basic information, passwords, random identification numbers and biological characteristics, a battery module 15 for providing working power of the mobile device 10, a wireless transmission module 16 for transmitting wireless communication network signals, and a central processor 17 connecting and controlling the input module 11, the identification module 12, the display module 13, the storage module 14, the battery module 15 and the wireless transmission module 16. The mobile device 10 further includes an expansion module 18 for expanding functions of the mobile device 10. The central processor 17 connects and controls the expansion module 18.

Referring to FIG. 1, the control device 20 connects with the mobile device 10 wirelessly. The control device 20 includes a wireless transceiver module 21 for transmitting the wireless communication network signals, a power module 22 for providing working power of the control device 20, a memory module 23 for storing the random identification numbers and the passwords, an electronic control module 24 and a microcontroller 25 connecting and controlling the wireless transceiver module 21, the power module 22, the memory module 23 and the electronic control module 24.

Referring to FIG. 1, the electronic control module 24 of the control device 20 is electrically connected with the electronic lock device 30 for locking or unlocking the electronic lock device 30. The wireless transmission module 16 of the mobile device 10 is connected with the wireless transceiver module 21 of the control device 20 wirelessly so as to connect the mobile device 10 with the control device 20 wirelessly.

Figure 2:
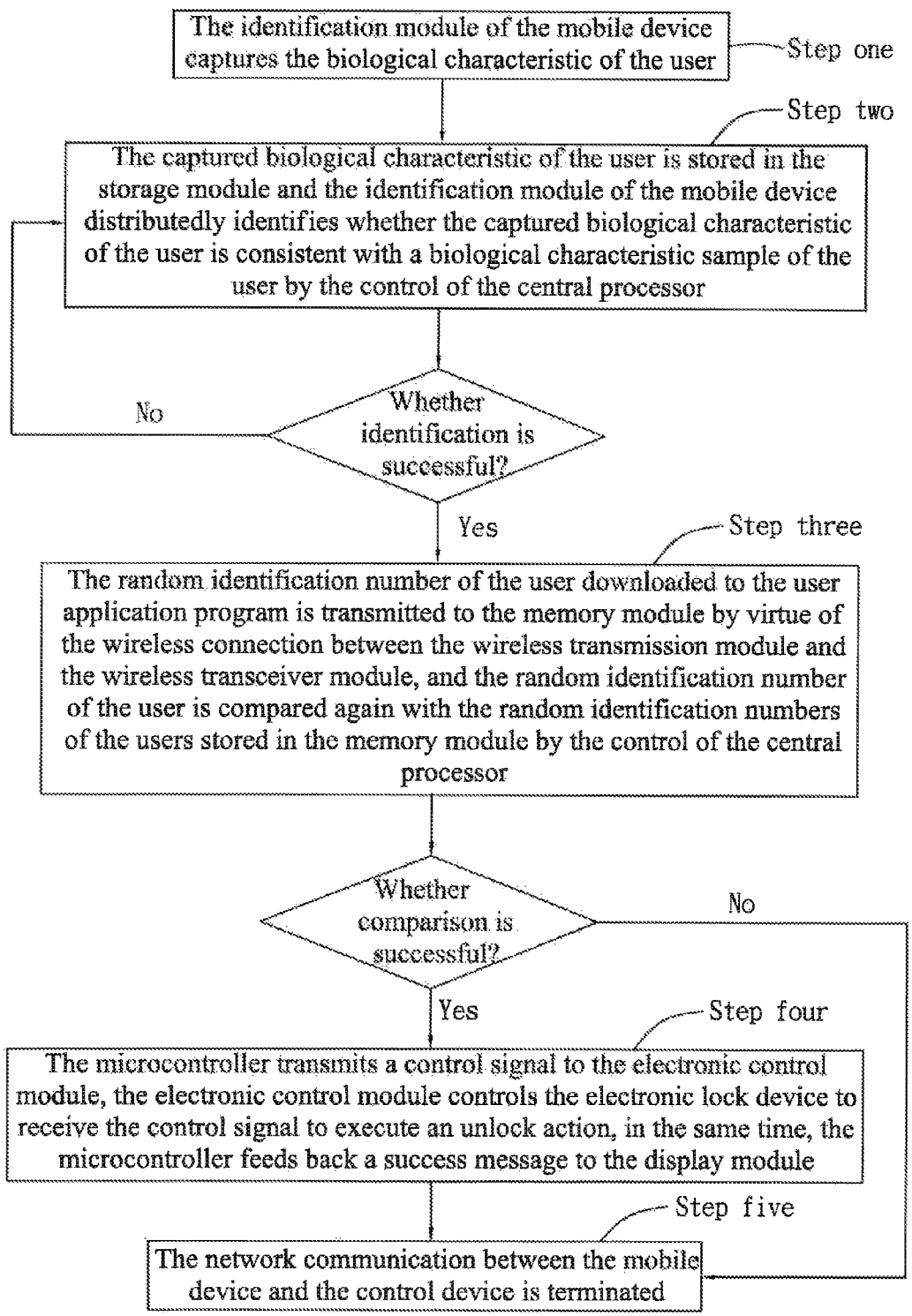
FIG. 2 is a flow chart of a control method of the access control system in accordance with the embodiment of the present invention.

Referring to FIG. 1 and FIG. 2, in use, before an administrator of the access control system 100 sets the access control system 100, an administrator application program and an administrator password of entering. an operation interface of the administrator application program are stored in the storage module 14 of the mobile device 10 which is used by the administrator of the access control system 100. The administrator of the access control system 100 opens the administrator application program, and the mobile device 10 is connected with the control device 20 wirelessly by virtue of the wireless connection between the wireless transmission module 16 and the wireless transceiver module 21. The administrator of the access control system 100 inputs the administrator password by the input module 11, the central processor 17 controls the display module 13 to display the operation interface of the administrator application program.

Referring to FIG. 1 and FIG. 2, when the administrator of the access control system 100 sets the access control system 100, the administrator of the access control system 100 can set the following functions in the operation interface of the administrator application program. First, the administrator can set and modify the basic information of the access control system 100, such as time, date and so on. Second, the administrator can perform an operation of adding a user and can further set and modify the basic information of the user, such as name, job number and so on by the input module 11 in the operation interface of the administrator application program, and the administrator can give the password to the user and modify the password of the user, the basic information and the password of the user are stored in the storage module 14 of the mobile device 10 and are transmitted to the memory module 23 of the control device 20 by virtue of the wireless connection between the wireless transmission module 16 and the wireless transceiver module 21, in the process of adding the user, the control device 10 generates a random identification number corresponding to the user and the random identification number of the user are stored in the memory module 23 of the control device 20. Third, the administrator can perform an operation of deleting the user and can further delete the basic information, the password and the random. identification number of the user by the input module 11 in the operation interface of the administrator application program. Fourth, the administrator can inquire historical records of the user who has passed the access control system 100 by the input module 11 in the operation interface of the administrator application program.

Referring to FIG. 1 and FIG. 2, before the user passing the access control system 100, a user application program is stored in the storage module 14 of the mobile device 10, the user opens the user application program, and the mobile device 10 is connected with the control device 20 wirelessly by virtue of the wireless connection between the wireless transmission module 16 and the wireless transceiver module 21, the central processor 17 controls the display module 13 to display an operation interface of the user application program. The user can load a biological characteristic sample of the user into the user application program and can download the random identification number of the user to the user application program in the operation interface of the user application program. The user can verify the biological characteristic of the user.

Referring to FIG. 1 and FIG. 2, when the user loads the biological characteristic sample of the user into the user application program and downloads the random identification number of the user to the user application program in the operation interface of the user application program, the user inputs the basic information and the password of the user by the input module 11, the basic information and the password of the user are stored in the storage module 14 and are compared with the basic information and the password of the user in the memory module 23 of the control device 20 by the control of the central processor 17. In the memory module 23 of the control device 20, when the basic information and the password of the user consistent with the basic information and the password of the user inputted by the user, the user makes the biological characteristic of the user correspond to the identification module 12, the identification module 12 of the mobile device 10 captures the biological characteristic of the user, the captured biological characteristic of the user is set as the biological characteristic sample. The biological characteristic sample is stored in the storage module 14 and is loaded into the user application program by the control of the central processor 17. The random identification number of the user stored in the memory module 23 is transmitted to the mobile device 10 by virtue of the wireless connection between the wireless transmission module 16 and the wireless transceiver module 21. The random identification number of the user is stored in the storage module 14 and is downloaded to the user application program by the control of the central processor 17, so that the user has an authority to pass the access control system 100.

Referring to FIG. 1 and FIG. 2, when the user wants to pass the access control system 100, the microcontroller 25 of the control device 20 controls the electronic control module 24 to set an original status of the electronic lock device 30 as a lock status, the user opens the user application program, and the mobile device 10 is connected with the control device 20 wirelessly by the wireless connection between the wireless transmission module 16 and the wireless transceiver module 21, the central processor 17 controls the display module 13 to display the operation interface of the user application program.

Referring to FIG. 1 and FIG. 2, then the identification module 12 identifies the biological characteristic of the user, the user makes the biological characteristic of the user correspond to the identification module 12, the identification module 12 of the mobile device 10 captures the biological characteristic of the user, the captured biological characteristic of the user is stored in the storage module 14, and the identification module 12 of the mobile device 10 distributedly identifies whether the captured biological characteristic of the user is consistent with the biological characteristic sample of the user loaded into the user application program by the control of the central processor 17. If the biological characteristic of the user loaded into the user application program is consistent with the captured biological characteristic of the user, the random identification number of the user downloaded to the user application program is transmitted to the memory module 23 of the control device 20 by virtue of the wireless connection between the wireless transmission module 16 and the wireless transceiver module 21, and the random identification number of the user is compared again with the random identification numbers of the users stored in the memory module 23 of the control device 20 by the control of the central processor 17.

Referring to FIG. 1 and FIG. 2, in the memory module 23 of the control device 20, if there is the random identification number of the user consistent with the transmitted random identification number of the user, the microcontroller 25 of the control device 20 transmits a control signal to the electronic control module 24 of the control device 20, the electronic control module 24 controls the electronic lock device 30 to receive the control signal to execute an unlock action. In the same time, the microcontroller 25 feeds back a success message to the display module 13 by virtue of the wireless connection between the wireless transmission module 16 and the wireless transceiver module 21, and a network communication between the mobile device 10 and the control device 20 is terminated. In addition, the storage module 14 of the mobile device 10 records the basic information and the time of the user who unlocks the electronic lock device 30 in this time, so that it's convenient for the administrator to inquire the historical records of the users who have passed the access control system 100. In the memory module 23, if there is no random identification number of the user consistent with the transmitted random identification number of the user, the electronic lock device 30 keeps the lock status. In the same time, the microcontroller 25 feeds back a failure message to the display module 13 by virtue of the wireless connection between the wireless transmission module 16 and the wireless transceiver module 21, and the network communication between the mobile device 10 and the control device 20 is terminated.

Referring to FIG. 1 and FIG. 2, specific steps of the control method of the access control system 100 in accordance with the embodiment of the present invention are described as follows.

Step one: the identification module 12 of the mobile device 10 captures the biological characteristic of the user.

Step two: the captured biological characteristic of the user is stored in the storage module 14 and the identification module 12 of the mobile device 10 distributedly identifies whether the captured biological characteristic of the user is consistent with the biological characteristic sample of the user by the control of the central processor 17. If the identification is successful, execute step three. If the identification is failed, returns to execute the step one until the identification is successful. Then execute the step three.

Step three: the random identification number of the user downloaded to the user application program is transmitted to the memory module 23 by virtue of the wireless connection between the wireless transmission module 16 and the wireless transceiver module 21, and the random identification number of the user is compared again with the random identification numbers of the users stored in the memory module 23 by the control of the central processor 17. If the comparison is successful, execute step four. If the comparison is failed, the microcontroller 25 feeds back a failure message to the display module 13. Then execute step five.

Step four: the microcontroller 25 transmits a control signal to the electronic control module 24, and the electronic control module 24 controls the electronic lock device 30 to receive the control signal to execute an unlock action. In the same time, the microcontroller 25 feeds back a success message to the display module 13.

Step five: the network communication between the mobile device 10 and the control device 20 is terminated.

As described above, the identification module 12 of the mobile device 10 captures the biological characteristic of the user so as to make the identification module 12 of the access control system 100 identify the biological characteristic of the user, so as to lower an identification burden of the access control system 100 and ensure a usage security of the access control system 100. Furthermore, the captured biological characteristic of the user is stored in the storage module 14 and the identification module 12 of the mobile device 10 distributedly identifies whether the captured biological characteristic of the user is consistent with the biological characteristic sample of the user by the control of the central processor 17 so as to lower a misidentification rate of the access control system 100.

What is claimed is:

1. An access control system, comprising:
a mobile device including an input module for inputting data, an identification module for capturing and identifying biological characteristics, a display module for displaying information of the mobile device, a storage module for storing application programs, basic information, passwords, random identification numbers and biological characteristics, a battery module for providing working power of the mobile device, a wireless transmission module for transmitting wireless communication network signals, and a central processor connecting and controlling the input module, the identification module, the display module, the storage module, the battery module and the wireless transmission module;
a control device connecting with the mobile device wirelessly, the control device including a wireless transceiver module for transmitting the wireless communication network signals, a power module for providing working power of the control device, a memory module for storing the random identification numbers and the passwords, an electronic control module and a microcontroller connecting and controlling the wireless transceiver module, the power module, the memory module and the electronic control module; and
an electronic lock device, the electronic control module of the control device being electrically connected with the electronic lock device for locking or unlocking the electronic lock device,
wherein an administrator application program and an administrator password of entering an operation interface of the administrator application program are stored in the storage module of the mobile device which is used by the administrator of the access control system, the administrator of the access control system opens the administrator application program, and the mobile device is connected with the control device wirelessly by virtue of the wireless connection between the wireless transmission module and the wireless transceiver module, the administrator of the access control system inputs the administrator password by the input module, then the central processor controls the display module to display the operation interface of the administrator application program.

2. The access control system as claimed in claim 1, wherein the wireless transmission module of the mobile device is connected with the wireless transceiver module of the control device wirelessly so as to connect the mobile device with the control device wirelessly.

3. The access control system as claimed in claim 1, wherein the mobile device is a cell phone.

4. The access control system as claimed in claim 1, wherein the mobile device further includes an expansion module for expanding functions of the mobile device, the central processor connects and controls the expansion module.

5. The access control system as claimed in claim 1, wherein the administrator can set and modify the basic information of the access control system by the input module in the operation interface of the administrator application program.

6. The access control system as claimed in claim 1, wherein the administrator can perform an operation of adding a user and can further set and modify the basic information of the user by the input module in the operation interface of the administrator application program, and the administrator can give the password to the user and modify the password of the user, the basic information and the password of the user are stored in the storage module of the mobile device and transmitted to the memory module of the control device by virtue of the wireless connection between the wireless transmission module and the wireless transceiver module, in the process of adding the user, the control device generates a random identification number corresponding to the user and the random identification number of the user are stored in the memory module of the control device, the administrator can perform an operation of deleting the user and can further delete the basic information, the password and the random identification number of the user by the input module in the operation interface of the administrator application program.

7. The access control system as claimed in claim 6, wherein the administrator can inquire historical records of the user who has passed the access control system by the input module in the operation interface of the administrator application program.

8. The access control system as claimed in claim 6, wherein a user application program is stored in the storage module of the mobile device, the user opens the user application program, and the mobile device is connected with the control device wirelessly by virtue of the wireless connection between the wireless transmission module and the wireless transceiver module, the central processor controls the display module to display an operation interface of the user application program, the user can load a biological characteristic sample of the user into the user application program and can download the random identification number of the user to the user application program in the operation interface of the user application program, the user can verify the biological characteristic of the user.

9. A control method of the access control system as claimed in claim 1, comprising the steps of:
  step one: the identification module of the mobile device capturing the biological characteristic of the user;
  step two: the captured biological characteristic of the user being stored in the storage module and the identification module of the mobile device distributedly identifying whether the captured biological characteristic of the user is consistent with a biological characteristic sample of the user by the control of the central processor;
  step three: the random identification number of the user downloaded to the user application program being transmitted to the memory module by virtue of the wireless connection between the wireless transmission module and the wireless transceiver module, and the random identification number of the user being compared again with the random identification numbers of the users stored in the memory module by the control of the central processor;
  step four: the microcontroller transmitting a control signal to the electronic control module, the electronic control module controlling the electronic lock device to receive the control signal to execute an unlock action, in the same time, the microcontroller feeding back a success message to the display module; and
  step five: the network communication between the mobile device and the control device being terminated;
  wherein in the step two, if the identification is successful, execute the step three; if the identification is failed, return to execute the step one until the identification is successful, then execute the step three;
  wherein in the step three, if the comparison is successful, execute the step four; if the comparison is failed, the microcontroller feeds back a failure message to the display module and execute the step five.

* * * * *